May 5, 1931. A. C. PETERS 1,803,485
STUD AND GROMMET FASTENER
Filed Aug. 6, 1928
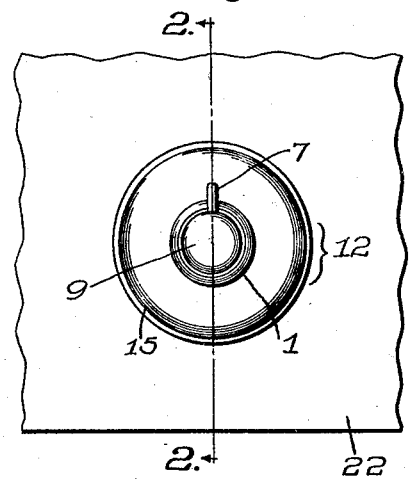
Fig. 1.
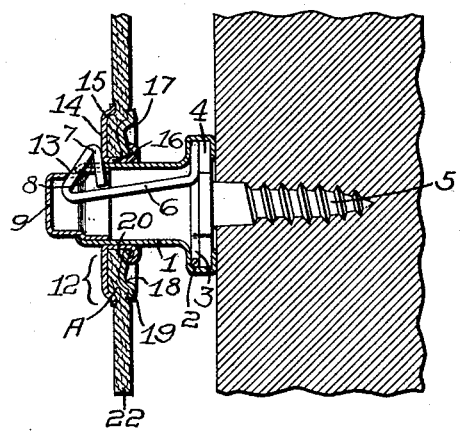
Fig. 2.
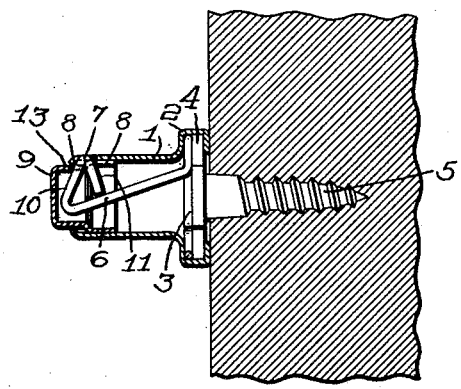
Fig. 3.
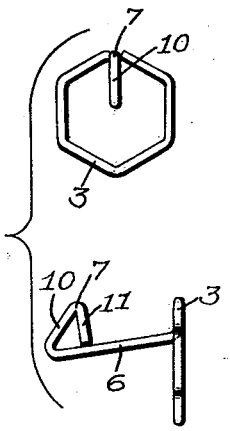
Fig. 4.
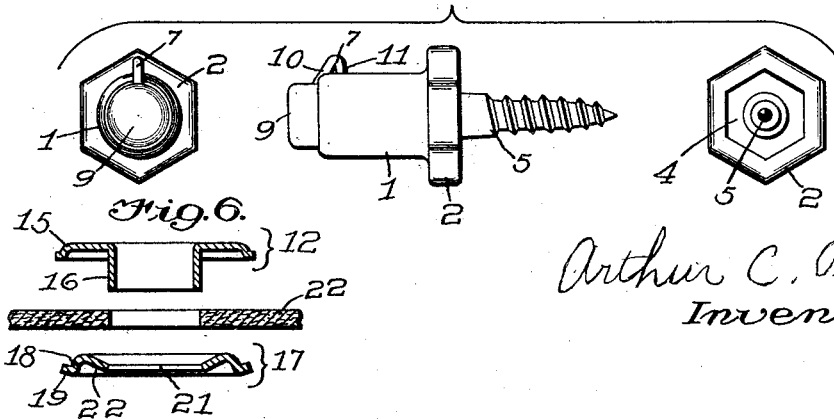
Fig. 5.
Fig. 6.
Arthur C. Peters
Inventor Patented May 5, 1931

1,803,485

UNITED STATES PATENT OFFICE

ARTHUR C. PETERS, OF CHICAGO, ILLINOIS, ASSIGNOR TO CINCH MANUFACTURING CORPORATION, OF CHICAGO, ILLINOIS, A CORPORATION OF ILLINOIS

STUD AND GROMMET FASTENER

Application filed August 6, 1928. Serial No. 297,587.

My invention relates to separable fasteners which includes a grommet adapted to be removably held by a stud.

In the drawings which accompany and form a part of this application, Figure 1 is a front elevation of the separable fastener used as a curtain fastener; Fig. 2 is a vertical section taken on the plane of line 2—2 of Figure 1 with portions of the stud being illustrated in elevation; Fig. 3 is a view of the stud similar to the one shown in Fig. 2, except that the press-button has been pushed to release the socket; Fig. 4 is directed to the spring member of the stud and a front and a side elevation thereof are illustrated; Fig. 5 is directed to front, side and rear elevational views of the stud; and Fig. 6 is a section through the detached members of the grommet and the material to which it is to be applied.

My improved fastener comprises, in combination, a stud which is an improvement over the stud shown and described in the United States Letters Patent No. 1,415,129, issued to John Vodicka May 9, 1922, and a socket or grommet which is an improvement over United States Letters Patent No. 1,430,129, issued to John Vodicka September 26, 1922. Therefore, I refer to the above patents and will describe only as much of the stud and grommet as is necessary for a complete understanding of my invention.

The stud member has a hollow stud post having a shank portion 1 and a base portion 2. The stud post contains a spring wire yieldable member having a hexagonally shaped portion 3 fitted into the base portion 2 and held in place by the head 4 of the screw 5. A yieldable portion 6 extends from the hexagonal portion 3 into the shank 1 and a latch or nose portion 7 is provided at one end of the yieldable portion 6 by bending the end of the spring wire, as shown in Fig. 2. This nose portion 7 normally projects through a slot 8 in the side wall of the shank 1.

The shank 1 is open at its outer end and a hollow plunger or press-button 9 is fitted into the open end and assembled with the stud. The plunger 9 is also provided with a slot 8ª through which a portion of the nose portion 7 passes.

The nose portion 7 of the wire spring has an inclined bend 10 and also a sharp bend 11. The former bend 10 permits engagement of the grommet 12 with the stud by merely pushing it over the end of the shank 1. The latter bend 11 provides means for locking the stud and grommet together.

Separation of the fastener may be effected by simply pressing inwardly upon the projected end of the plunger 9. The cam portion 13 at the end of the slot 8ª in the plunger 9 engages the inclined bend 10 and draws the nose toward the axis of the stud, as shown in Fig. 3, and the grommet may be removed.

The spring element is formed from a single piece of wire and takes the place of three pieces in the construction shown in the above referred to Patent No. 1,415,129. Therefore, I have provided a stud unit which is easier to assemble, has fewer parts and is less expensive to manufacture while being durable and efficient.

Referring now to my grommet member of the fastener it will be seen (Fig. 6) that the grommet includes the eyelet 12 having a dished portion provided with a flat bottom and an annular wall 15, a flange extending outwardly from the upper edge of the wall, and a tubular rivet portion 16 formed in the center of the eyelet. The washer 17 of the grommet, before assembly, is dish shaped and has an upstanding wall 18, a flange 19 extending outwardly from the upper edge of the wall, and a frusto-conical portion 20 adjacent an aperture 21.

In applying the parts of the grommet to the flexible material 22, which has been previously perforated, the rivet portion 16 is thrust through the perforation in the material 22 and the aperture 21 in the washer. Then a suitable setting tool turns over the free edge of the rivet portion to clamp the two parts of the grommet against the carrying medium. When the setting operation is complete, the carrying medium will be gripped much more firmly adjacent the upstanding walls of the parts of the grommet than anywhere else.

It should be noticed (Figs. 2 and 6) that the frusto-conical portion of the washer is flattened only very slightly from its normal shape thereby leaving a space inside of the tightly gripped portion A of the carrying medium where the carrying medium is bunched by the squeezing of it adjacent the wall. Thus, I provide a grommet which grips the carrying medium very tightly at a substantial distance from the edge of the perforation while leaving a space at the edge of the perforation where the material is bunched. Therefore, when the carrying medium is stressed, lateral pulling out of the material is avoided, because of the firm grip between the upstanding walls and because the bunched portion B cannot readily be pulled through the narrow annular space between the walls.

I claim:

1. A snap fastener stud having a hollow shank and a one-piece spring wire latch presenting member assembled with said shank, said latch presenting member having a latch portion normally extending through an opening in the shank for engagement with a socket, a portion fixed relative to said shank and a movable portion located within the hollow shank and connecting the fixed portion and the latch portion to permit movement of the latch portion with respect to said shank and an axially movable latch operating plunger normally pressed in one direction by the latch presenting member and adapted to be pressed in the opposite direction to move the latch portion into the hollow shank and permit disengagement from the stud of a cooperating fastener socket.

2. A snap fastener stud comprising a hollow shank open at one end and having a base flange at the opposite end, an attaching member having a head secured within said base flange, a member formed entirely from a single piece of wire and having a portion 3 rigidly secured between the base flange and the head of the attaching member, a yieldable portion 6 having a portion extending first toward the axis of the stud from the portion 3 and normally engaging the head of the attaching member and a latch portion 7 normally extending from said yieldable portion 6 through a slot in the shank and an axially movable plunger presented at the aperture in said shank and having means which cooperates with the latch portion 7 to force it into the hollow shank when said plunger is pressed toward said base flange and said yieldable portion 6 acting through said latch to return said plunger.

3. A fastener stud including a hollow shank portion having a base, a latch element formed entirely of wire and having a portion rigidly secured in the base of the shank portion, a yieldable portion extending from said rigid portion into the shank portion and said latch element having a nose portion carried by said yieldable portion and normally projecting through an opening in the hollow shank portion for securing a socket with the stud and a longitudinally movable plunger assembled as a part of the fastener stud at the socket engaging end thereof and having means for moving the nose portion of the latch element toward the axis of the stud when the plunger is pressed toward the base of the stud.

4. A grommet installation comprising a dish-shaped member provided with a bottom, a rivet portion extending from said bottom, a wall extending from said bottom and surrounding said rivet portion a substantial distance therefrom and a second dish-shaped member having a concavo-convex bottom which remains concavo-convex when the parts of the installation are completely assembled and has an aperture to receive said rivet portion, said second mentioned dish-shaped member having a wall adapted to cooperate with the wall of the first mentioned dish-shaped member, said dish-shaped members secured to opposite sides of a fabric by said rivet and gripping the fabric tightly between the two walls, and said concavo-convex portion providing a space into which the fabric is squeezed to form a bunch adjacent to the rivet to assist in preventing loosening of the fabric from between the two members of the grommet when the fabric is subjected to lateral strains.

5. A grommet installation comprising, when assembly is complete, two dish-shaped members secured to opposite sides of a fabric, one of said members having a wall which nests with a similar wall of the other part to grip the fabric tightly between them, each member having a base and one member having a tubular rivet extending from its base through a hole in the base of the other member and clenched against the base of the member presenting the hole and the base of one member being frusto-conical, thereby being spaced a greater distance at a point adjacent to the rivet than at the base of the other member from a point adjacent where said walls grip the fabric thereby providing an enlarged space between said bases and adjacent to said rivet in which the fabric is bunched.

In testimony whereof I have signed my name to this specification.

ARTHUR C. PETERS.